United States Patent [19]

Cané

[11] Patent Number: 5,193,630
[45] Date of Patent: Mar. 16, 1993

[54] DEVICE PARTICULARLY SUITABLE FOR THE AUTOMATIC CHECKING OF THE WEIGHT OF A PRODUCT PUT INTO BOTTLES BY HIGH-OUTPUT MICRO-FEEDERS

[75] Inventor: Alessandro Cané, Bologna, Italy

[73] Assignee: IMA Industria Macchine Automatiche S.p.A., Ozzano Emilia, Italy

[21] Appl. No.: 811,668

[22] Filed: Dec. 23, 1991

[30] Foreign Application Priority Data

Jan. 23, 1991 [IT] Italy ............... GE91 A 000022

[51] Int. Cl.$^5$ ................. G01G 19/52; B65G 47/26; B07C 5/16
[52] U.S. Cl. ........................... 177/50; 177/145; 198/427; 209/592
[58] Field of Search .......... 177/50, 145; 198/427; 209/592, 596

[56] References Cited

U.S. PATENT DOCUMENTS

| | | | |
|---|---|---|---|
| 2,701,639 | 2/1955 | Petrea | 209/596 |
| 4,339,028 | 7/1982 | Meacle | 198/427 |
| 5,064,009 | 11/1991 | Melcher et al. | 177/145 X |
| 5,072,797 | 12/1991 | Hughes | 177/50 X |
| 5,092,414 | 3/1992 | Blezard | 177/145 X |

Primary Examiner—George H. Miller, Jr.
Attorney, Agent, or Firm—Larson and Taylor

[57] ABSTRACT

During the transfer into the weighing unit (K), the bottle (F) is held in the compartment (S1) of the transfer container (C), preferably by suction. An elevating comb (4) which receives the bottle extracted from the microfeeder and which with a subsequent lowering movement deposits it on the underlying grid-shaped platform (8) of the balance (9) operates in the weighing unit. This platform is provided, for each transfer container (C), with a shallow recess (10), ideally in the form of a horizontal downward-converging truncated cone, in which the bottle centers itself under the effect of gravity, moving away from the walls of the container and from the fixed lateral guides in order not to distort the action of the balance.

4 Claims, 2 Drawing Sheets 5,193,630

DEVICE PARTICULARLY SUITABLE FOR THE AUTOMATIC CHECKING OF THE WEIGHT OF A PRODUCT PUT INTO BOTTLES BY HIGH-OUTPUT MICRO-FEEDERS

SUMMARY OF THE INVENTION

In the course of the production and use of weight checking systems combined with high-output micro-feeders, for example as described in U.S. Pat. No. 1,172,655 in the name of the present applicant, to which the most ample reference will be made, certain improvements, forming the subject of the present patent application, were found to be advantageous.

In order to provide a better understanding of the objects of the invention, it will be useful to mention briefly that the weighing system referred to here provides, firstly, the checking of the weight of the empty bottle and, subsequently, the checking of the weight of the bottle, still open, with the portion of product inside it. The two weights are determined by electronic balances connected to a computer which determines the net weight of the portion of product and compares it with a predetermined parameter to check its accuracy. If the portion of product exceeds or falls short of the predetermined limits, the computer can generate a signal which automatically regulates the operation of the defective feeder via suitable servosystems.

The bottles are taken from the conveyor line of the micro-feeder and are returned to it, in a logical sequence which ensures the progressive checking of all the feeders, by containers which operate transversely on the line. When the container comes into operation, a bottle is extracted from the conveyor line and transferred to a lateral weighing balance. In the subsequent phase, while the container returns the weighed bottle to the line, the same container extracts a bottle from the same line and places it in a waiting area or on another weighing unit, the whole being done in such a way that the position of the bottles moving on the conveyor line does not change with respect to the operating elements of the machine.

In such a weighing system or in a similar system, it has been found that the direct transfer of the bottles onto the platform of the balance gives rise to vibrations which are difficult to damp out electronically and do not permit high operating speeds of said weighing system, which are however required by the continually accelerating output rates of micro-feeders.

Another disadvantage is represented by the fact that the bottle transferred onto the balance may remain partly in contact with one of the sides of the compartment of the transfer container and/or with the fixed lateral guides, distorting the action of said balance.

The invention is intended to avoid these and other disadvantages by the following concept of a solution.

At least during the transfer from the conveyor line of the micro-feeder to the weighing unit, the bottle is held in the compartment of the container which carries out the transfer, for example by means of suction. In this way the vibrations which the bottle would transfer to the whole system if free to move in the compartment are eliminated.

A further improvement consists in the fact that the bottle to be weighed is transferred onto a comb located laterally with respect to, and at the same height as, the conveyor line of the micro-feeder. On completion of the transfer, the suction in the compartment of the transfer container is neutralized, and the comb is lowered to deposit the bottle carefully on the grid-shaped platform of the balance. The part of this platform on which the bottle is deposited is provided with a shallow recessed housing, ideally in the form of a downward-converging truncated cone, in which said bottles center themselves under the effect of gravity, proportionally moving away from the sides of the transfer container compartment and from the fixed lateral guides. The bottle thus reaches the balance without producing damaging vibrations, carefully, and not in contact with fixed parts, so that it may be weighed rapidly and accurately.

BRIEF DESCRIPTION OF THE DRAWINGS

Further characteristics of the invention, and the advantages derived therefrom, will be evident from the description which follows of a preferred embodiment of invention, illustrated purely by way of non-limiting example in the figures in the two attached sheets of drawings, in which.

DESCRIPTION OF THE PREFERRED EMBODIMENTS

Figure 1:
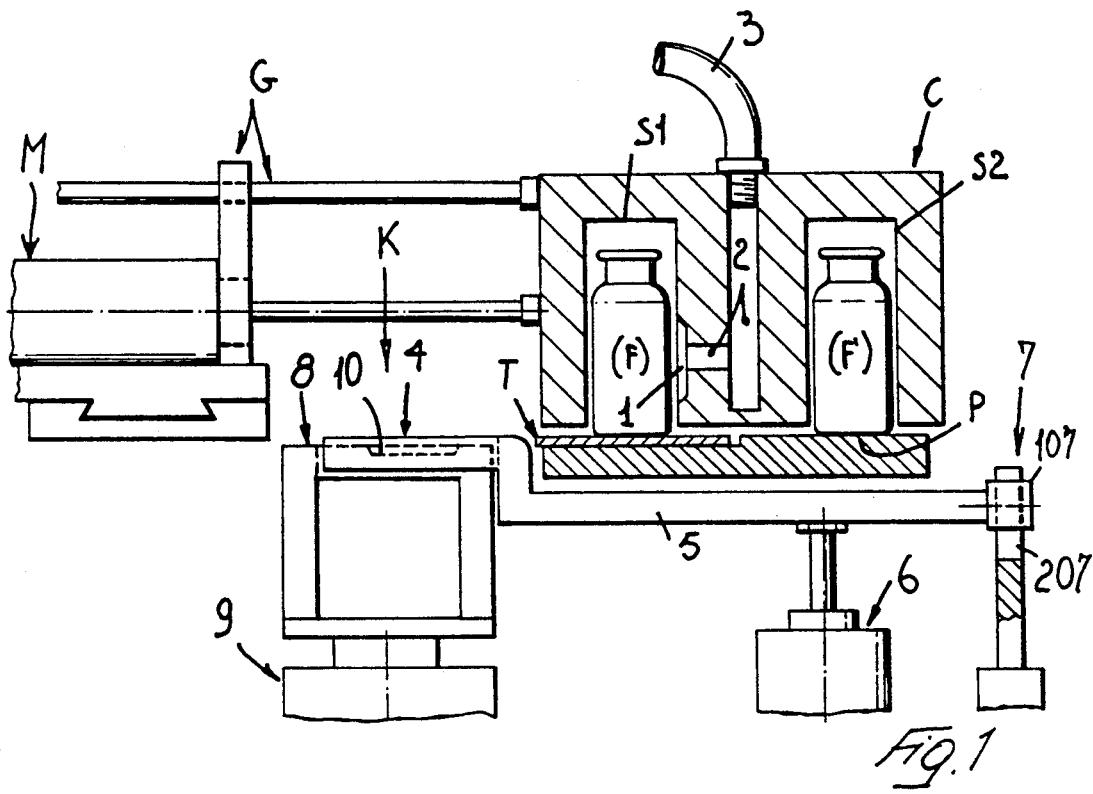
FIGS. 1, 2 and 3 show a front view of the device, with parts in action and in the various operating states.
Figure 4:
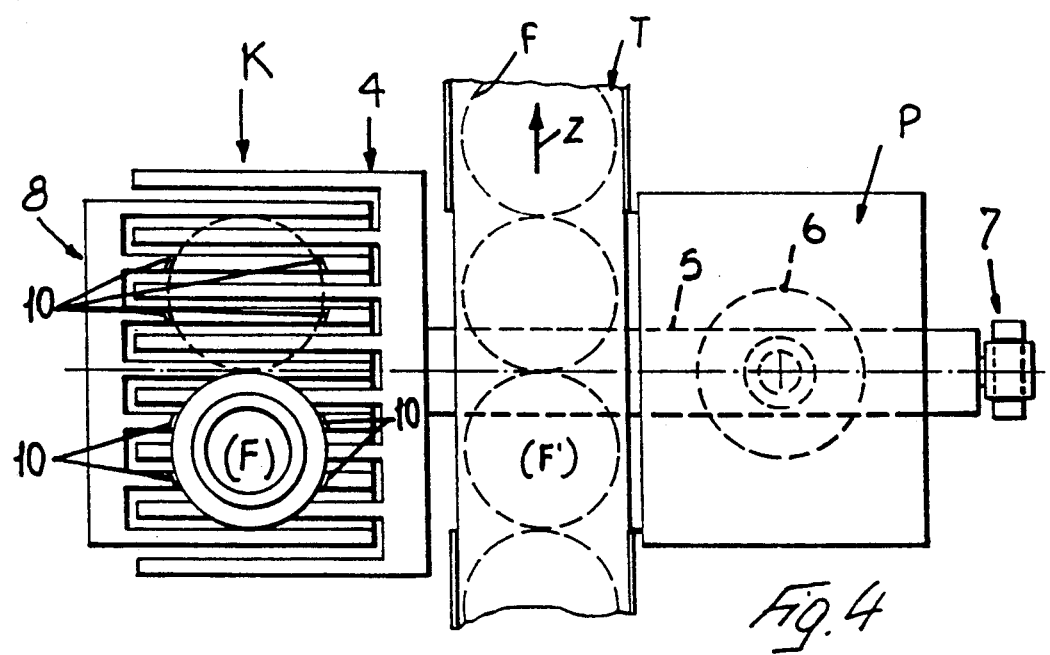
FIG. 4 shows a plan view of the device without the bottle transfer container.

In FIGS. 1 and 4, to which reference will initially be made, T indicates the conveyor line on which the bottles F move in single file and in mutual contact, in the direction Z, towards the filling units of the microfeeder, or on which they come from such units already full of product; in either case, the bottles have to be weighed. In the weighing area, transfer containers C having a frontal configuration substantially in the shape of an "m", and connected to the traversing cylinder M and to the guide means G which keep them in the correct vertical position, normally operate in pairs, being disposed side by side and transversely with respect to the line T. When the container is in the rest position, as in FIG. 1, the compartment S1 of container straddles the line T and is passed through by the bottles F, while the other compartment S2 is above a waiting island P and is occupied by a bottle F, extracted from the line T in the preceding operating cycle of the equipment concerned.

Figure 2:
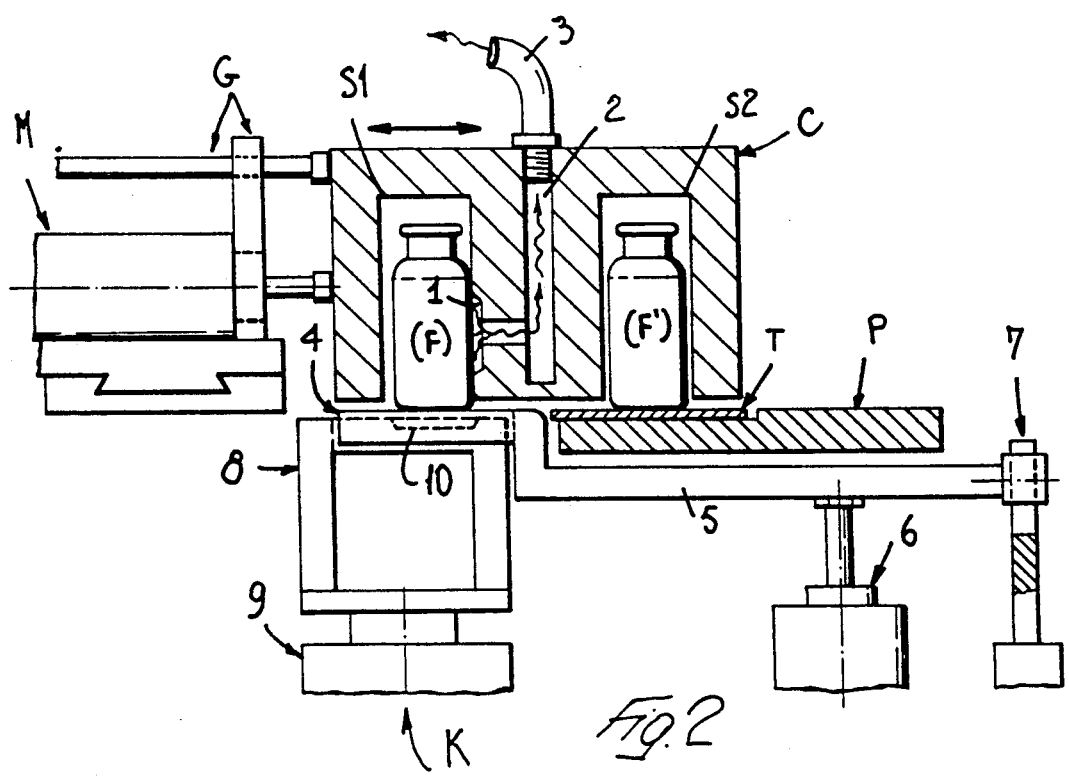

When the actuator M is activated to traverse the container C to the left as seen in the drawing, as shown in FIG. 2, a bottle F is extracted from the line T and transferred to the weighing unit K, while the bottle F' coming from the waiting island P is inserted on said line T. As already stated in the patent cited in the introduction to the present description, the island P may be replaced by a weighing unit of the same type as that indicated by K.

In FIGS. 1 and 2 it will be seen that a first improvement according to the invention consists in the presence, at least in the compartment which transfers the bottle toward the weighing point, in compartment S1 in the present example, and at least on the side of said compartment on which said bottle rests by reaction in the transfer phase, of an aperture 1 connected to a duct 2 formed in the container C which is connected in turn, by means of a flexible duct 3 and means of interception, not shown, to a suction source which is also not shown. In the phase of transfer of the bottle F from the line T to the weighing station K, the aperture 1 is connected to the suction source to hold the bottle in the container, for the following purposes: to ensure that the operation of said container is reliable, even at high traversing speeds; and to avoid the vibrations which the bottle would otherwise produce in transfer and in stopping if free to move in the compartment S1.

A further improvement consists in having disposed at the point K, coplanar with the line T, a comb elevator 4, fixed to and projecting from the end of an arm 5 fixed to the vertical rod of a cylinder and piston assembly 6 or to another suitable elevating and lowering means, and having its other end engaged with guide and slide means 7 which prevent undesired rotary movements of said arm with respect to the vertical. The means 7 may, for example, comprise on the arm 5 a roller 107 engaging with a vertical fixed fork 207.

The comb elevator 4 is appropriately located above the complementary grid-shaped platform 8 of the weighing balance 9. The upper part of the grid-shaped platform 8 on which the bottle is to be deposited is provided, for each extraction container C, with a recess 10, ideally in the form of a shallow truncated cone, with downward-converging side walls, and with a base width equal to the external diameter of the bottles F. This recess has a fixed and predetermined position with respect to the extraction travel limit of the container C and of other fixed parts, to permit the following.

Figure 3:
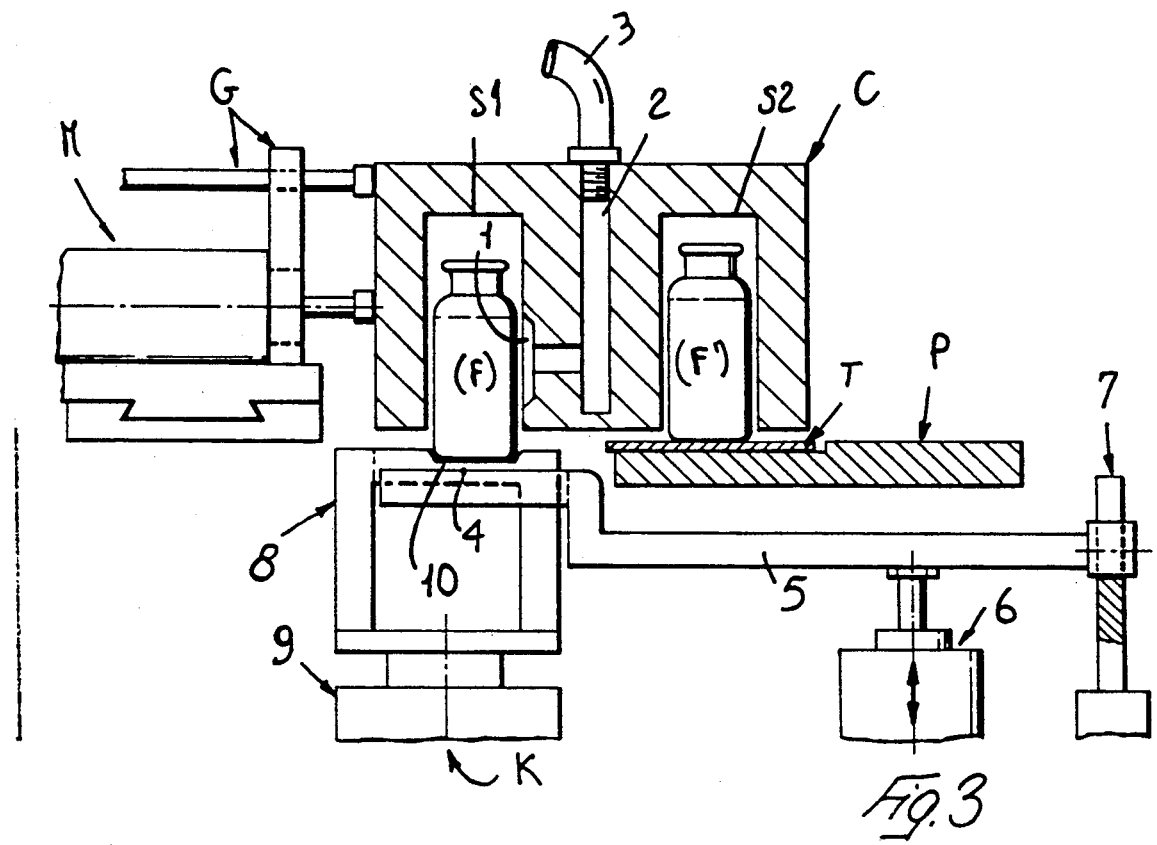

When the container transfers a bottle to the point K, the elevator comb 4 is in the high position as in FIG. 2, to receive the transferred bottle. Any vibrations produced in the bottle transfer phase will thus be discharged onto the comb 4 and not onto the loading platform 8 of the balance. On completion of the transfer, the suction through the aperture 1 is neutralized, and the bottle F is free within S1 and the lateral guides which are not illustrated, since they are known. Exactly in phase, the elevator 4 is caused to be lowered as in FIG. 3, so as to deposit the bottle on the grid-shaped loading platform 8 of the balance. In this phase, the elevator is lowered below the grid-shaped platform 8 and the bottom of the bottle engages with the recess 10 in said platform, in which it centers itself under the effect of gravity. The bottle thus moves sufficiently away from the walls of the compartment S1 and of the fixed lateral guides with which it may initially have been in contact.

It is evident that the bottle reaches the platform 8 of the balance rapidly, without any appreciable vibration, and with reliable separation from fixed parts, as a result of which the weight measured by said balance will be exactly that of the bottle and of any product present in it.

On completion of the weighing, the bottle is raised by the elevator 4, as in FIG. 2, and is replaced on the line T by the container C, as in FIG. 1, while a bottle F, is transferred from the compartment S2 to the waiting or, optionally, weighing island P. The removal of the bottle from point K also takes place in such a way that no appreciable vibration reaches the balance 9.

I claim:

1. Improved device for weighing systems, particularly for micro-feeders, which carry out the extraction of a bottle (F) to be weighed from a conveyor line (T) on which bottles move in single file, the extraction being performed by a container (C) with a pair of portal type compartments arranged side by side (S1-S2), so that while one compartment extracts a bottle from said line, the other compartment inserts the bottle extracted in the preceding, cycle into the same line, characterized in that the improved device comprises an elevator comb (4) located laterally with respect to said conveyor line, normally coplanar with said line, and located above a complementary grid-shaped platform (8) connected to sensors of a weighing balance (9), the whole being done in such a way that the bottle to be weighed is initially transferred by container (C) to said comb which is subsequently lowered to deposit said bottle on the grid-shaped platform of the balance, without transmitting any appreciable vibration to the balance, in a similar way to what happens in the subsequent phases of the cycle when, on completion of weighing, the bottle is raised from the grid-shaped platform of the balance by the elevator comb which takes over the support of the bottle before it is traversed by container (C) and replaced on the conveyor line of the micro-feeder.

2. Device according to claim 1, characterized in that in the container (C) which transfers the bottle from the conveyor line of the micro-feeder to the weighing unit (K) there are provided means, of any suitable type to hold the bottle at least in the compartment (S1) with which the container performs said transfer, which are active at least in the principal phase of said transfer, with the purpose of permitting a high bottle displacement speed and in order to eliminate the vibrations which the bottle itself would transmit to the system if otherwise free to move even slightly in the compartment of the transfer container.

3. Device according to claim 2, characterized in that the compartment (S1) of the container (C) which transfers the bottle from micro-feeder to the weighing unit (K) and vice-versa is provided, at least on the side with which said compartment would in any way be brought into contact with the bottle during the active phase of the transfer, with at least one aperture (1) connectable via suitable circuits, ducts and controls (2-3) to a suction source, the whole with the purpose of holding the bottle in the compartment concerned, at least during the transfer to the weighing unit.

4. Device according to claim 1, characterized in that the grid-shaped platform (8) of the balance (9) is provided, in alignment with each transfer container (C), with a shallow horizontal recess (10), ideally in the form of a downward-converging truncated cone, in which the bottle centers itself under the effect of gravity when it is set down carefully onto said grid-shaped platform, so that it moves away from the sides of the compartment (S1) of the container (C) and from the fixed lateral guides, in order not to distort the action of the balance.

* * * * *